United States Patent [19]

Watanabe et al.

[11] Patent Number: 5,051,840

[45] Date of Patent: Sep. 24, 1991

[54] DEVICE FOR CODING A PICTURE SIGNAL BY COMPRESSION

[75] Inventors: Mikio Watanabe; Kenji Moronaga, both of Tokyo, Japan

[73] Assignee: Fuji Photo Film Co., Ltd., Kanagawa, Japan

[21] Appl. No.: 448,811

[22] Filed: Dec. 12, 1989

[30] Foreign Application Priority Data

Dec. 14, 1988 [JP] Japan .................................. 63-313840
Feb. 8, 1989 [JP] Japan ..................................... 1-27499

[51] Int. Cl.$^5$ ............................................ H04N 1/415
[52] U.S. Cl. ..................................... 358/433; 358/432; 358/426; 382/56
[58] Field of Search ................ 358/432, 433, 426, 136, 358/135, 133; 382/56; 364/725, 715.04, 521, 518

[56] References Cited

U.S. PATENT DOCUMENTS

4,722,003 1/1988 Kondo ................................ 358/135
4,868,641 9/1989 Modaresse ............................ 358/13
4,920,414 4/1990 Remus et al. ....................... 358/133
4,933,763 6/1990 Chantelou ........................... 358/136

Primary Examiner—Joseph A. Orsino
Assistant Examiner—Dov Popovici

[57] ABSTRACT

A picture signal compression coding device divides picture data into a plurality blocks and subjects the individual blocks of picture data to an orthogonal transform, a normalization, and a coding. The amounts of data to be allocated to the individual blocks are determined on the basis of the ratios of the activities of the individual blocks to a sum of the block-by-block activities, whereby the output of the individual blocks of coded data is restricted. The amount of coded data is allocated in matching relation to the frequency components of the individual blocks, so that more data are distributed to those blocks in which high frequency components are predominant. Further, the number of bits to be assigned to the entire picture is maintained constant.

6 Claims, 10 Drawing Sheets

| -1 | -1 | -1 |
|----|----|----|
| -1 | 8  | -1 |
| -1 | -1 | -1 |

FIG.4B

| 1  | 2  | 1  |
|----|----|----|
| 0  | 0  | 0  |
| -1 | -2 | -1 |

FIG.4C

| 1 | 0 | -1 |
|---|---|----|
| 2 | 0 | -2 |
| 1 | 0 | -1 |

DEVICE FOR CODING A PICTURE SIGNAL BY COMPRESSION

BACKGROUND OF THE INVENTION

1. Field of the Invention

The present invention relates to a device for coding a picture signal by compression and, more particularly, to a picture signal compression coding device which maintains the amount of compressed data representative of a picture constant at all times.

2. Description of the Related Art

Digital picture data representative of a picture picked up by an electronic still camera, for example, are stored in a memory. Various kinds of compression coding schemes have been proposed to reduce the amount of such digital picture data and thereby the required memory capacity. Among them, a two-dimensional orthogonal transform coding scheme is extensively used because it codes data by a large compression ratio and because it allows a minimum of picture distortions particular to coding to occur.

Two-dimensional orthogonal transform coding is such that picture data representative of a single picture are divided into a plurality of blocks, and the picture data are subjected to two-dimensional orthogonal transform block by block. The picture data, which undergo the orthogonal transform, i.e., transform coefficients, are compared with a predetermined threshold so as to discard those transform coefficients which are lower than the threshold. The transform coefficients lower than the threshold are treated as data zero thereafter. The remaining data are divided by a predetermined quantizing step value, or normalizing coefficient, and thereby quantized or normalized by a step size. By this kind of procedure, the values of transform coefficients, i.e., the dynamic range of amplitudes is suppressed.

The comparison of transform coefficients with a threshold and the normalization are often executed at the same time. Specifically, when transform coefficients are normalized by a predetermined normalizing coefficient and the results are turned to integers, the transform coefficients which are smaller than the normalizing coefficient turn out to be zero.

The two-dimensional orthogonal transform coding procedure stated above has some problems left unsolved. Specifically, coding picture data by applying a predetermined normalizing coefficient to transform coefficients results in the amount of data which is different from one coded picture data to another. Such coded picture data cannot be written in a memory whose capacity is limited without resorting to troublesome processing. More specifically, when a predetermined normalizing coefficient is used, picture data containing many high frequency components will have a large amount of data when coded while picture data containing many low frequency components will have a small amount of data when coded. The coded data of the picture data in which high frequency components are predominant sometimes amounts to five to ten times the coded data of the picture data in which low frequency components are predominant.

In light of the above description, there has been proposed a system which calculates the degree to which high frequency components are predominant, i.e., an activity block by block and selects a normalizing coefficient in matching relation to the calculated activity. However, changing the normalizing coefficient and, therefore, the compressing condition from one block to another as mentioned brings about another problem that the picture quality differs from one block to another, resulting in unstable picture quality. Further, the transform coefficients have to be calculated block by block.

SUMMARY OF THE INVENTION

It is therefore an object of the present invention to provide a picture signal compression coding device which normalizes picture data undergone two-dimensional orthogonal transform in matching relation to a picture of interest to thereby maintain the amount of coded picture data constant.

In accordance with the present invention, a picture signal compression coding device for dividing digital picture data representative of a single picture into a plurality of blocks and coding the individual blocks of digital picture data by two-dimensional orthogonal transform includes an orthogonal transforming section for subjecting each of the plurality of blocks of digital picture data to a two-dimensional orthogonal transform. A normalizing section normalizes the digital picture data transformed by the orthogonal transforming section. A coding section codes the data normalized by the normalizing means. A block activity calculating section calculates an activity of the picture data block by block. An activity adding section produces a total activity by summing up the activities of the individual blocks calculated by the block activity calculating section. A distributing section calculates amounts of data to be distributed to the individual blocks on the basis of a ratio of the block-by-block activity calculated by the block activity calculating section to the total activity calculated by the activity adding section. A control section restricts the amount of data to be outputted by the coding means in response to an output of the distributing section. The control means compares the amount of data to be allocated to any of the blocks of interest with the amount of data of that block being actually outputted by the coding section, and restricts the amount of data to be outputted by the coding means such that the amount of data from the coding section does not exceed the amount of data allocated to the above-mentioned block.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
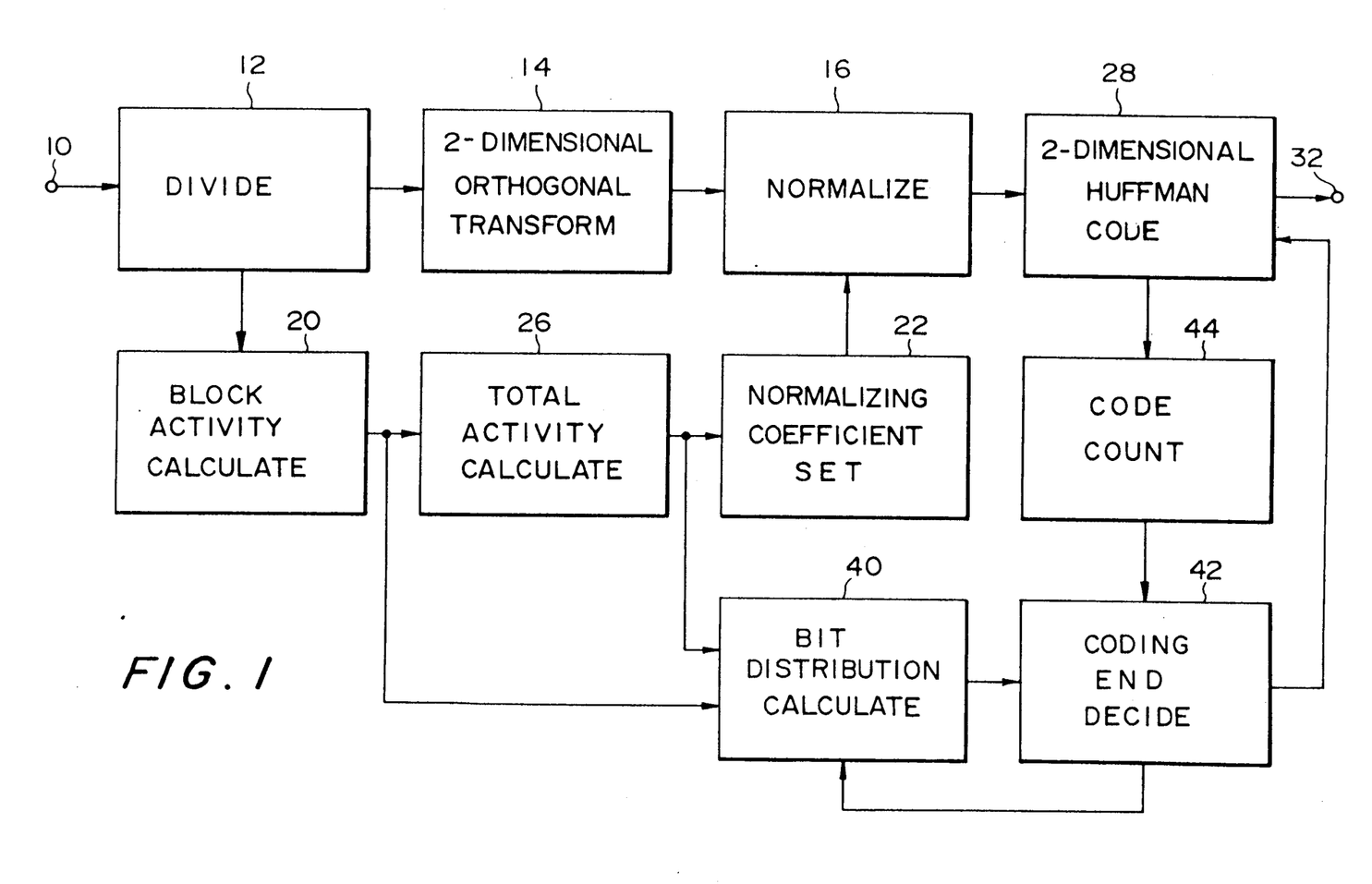
FIG. 1 is a schematic block diagram illustrating a picture signal compression coding device embodying the present invention.

Referring to FIG. 1 of the drawings, a compression coding device embodying the present invention is illustrated and includes a dividing section 12 which is implemented by a frame buffer. One frame of still picture data picked up by an electronic still camera, for example, is applied to and stored in the dividing section 12 via an input terminal 10. The dividing section 12 divides the one frame of picture data into a plurality of blocks and delivers them block by block to a two-dimensional orthogonal transforming section 14. The orthogonal transforming section 14 transforms the picture data block by block by a discrete cosine transform, a Hadamard transform or similar two dimensional orthogonal transform known in the art.

Each block of picture data, which undergoes the two-dimensional orthogonal transform as stated above, is arranged in rows and columns. The order of data sequentially increases from the top left in directions indicated by arrows. The output of the orthogonal transforming section 14 is fed to a normalizing section 16.

The normalizing section 16 compares the transformed picture data, i.e., transform coefficients from the orthogonal transforming section 14 with a predetermined threshold value so as to discard those coefficients which are smaller than the threshold value. The transform coefficients other than the discarded ones are divided by a predetermined quantizing step size, or a normalizing coefficient, α and thereby quantized by the normalizing coefficient α. The normalizing coefficient α is selected on the basis of the sum of activities of the individual block and by referencing a look-up table, as will be described in detail later.

Each block of data from the dividing section 12 is fed to a block activity calculating section 20 also. The block activity calculating section 20 determines the activities of the individual blocks, i.e., the degrees of the individual block to which picture data of high frequency components are predominant.

Figure 2:
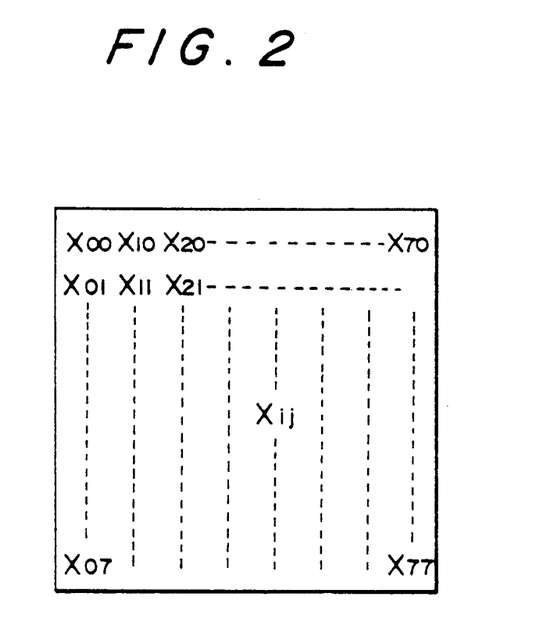
FIG. 2 illustrates an example of pixel data contained in a block.
Figure 6:
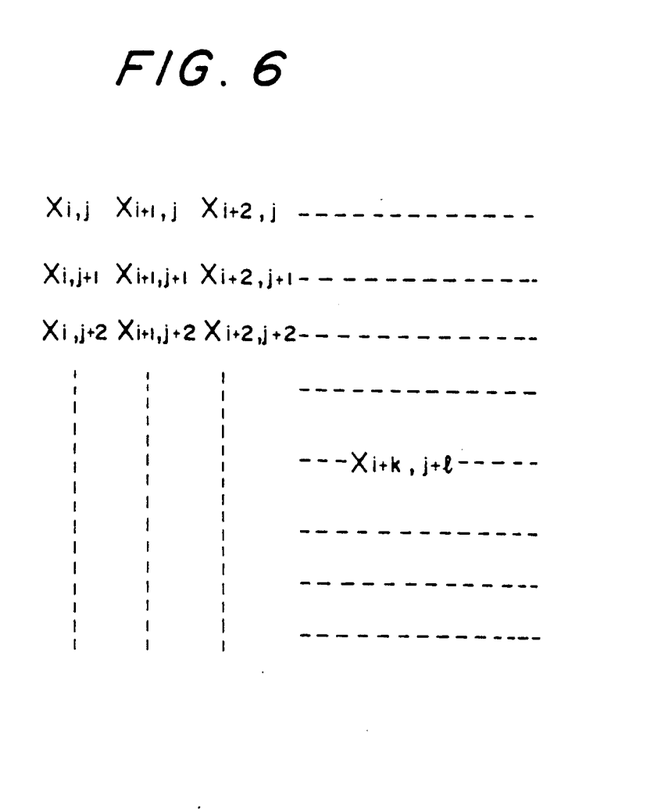
FIG. 6 illustrates an example of pixel data constituting a block.

Assume that each of the divided blocks is constituted by 8 × 8 pixels, as illustrated in FIG. 2 or 6 by way of example. Then, the activity ACT (i,j) of any of the blocks each having pixel data Xij (representative of addresses in the block) is expressed as:

$$ACT(i, j) = \sum_{k=0}^{7} \sum_{l=0}^{7} |X(i + K, j + l) - DC(i,j)|$$

where $$DC(i, j) = 1/64 \cdot \sum_{k=0}^{7} \sum_{l=0}^{7} X(i + K, j + l)$$

As the above equation indicates, the activity ACT (i,j) is determined by averaging the values of the 8 × 8 pixel data which constitute one block, and adding to the resulting mean value DC (i,j) the absolute values of the differences between the individual pixel data and the mean value DC (i,j). More specifically, the individual pixel data of one block are added, and then the sum is divided by 64 to produce the mean value DC (i,j). This procedure needs only an adder and the shift of data. Further, the activity ACT (i,j) is attainable by using the mean value DC (i,j) and an absolute value circuit and an adder. The activity, therefore, can be calculated without resorting to a multiplier and a divider.

Figure 3:
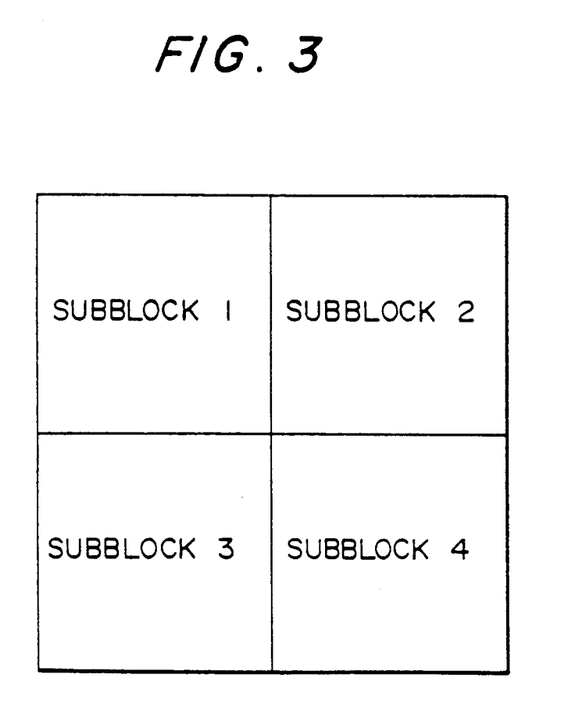
FIG. 3 illustrates subblocks which may be defined by subdividing a single block.

FIG. 3 is representative of an alternative approach for the calculation of the block-by-block activity. As illustrated one block is subdivided into four subblocks 1, 2, 3 and 4, and the activities of the individual subblocks are summed up. In this case, the activity ACT (i,j) of the whole block is determined by the following equation:

$$ACT(i, j) = \sum_{k=0}^{3} \sum_{l=0}^{3} |X(i + K, j + l) - DC(i, j, 0)| +$$

$$\sum_{k=0}^{3} \sum_{l=0}^{3} |X(i + 4 + K, j + l) - DC(i, j, 1)| +$$

$$\sum_{k=0}^{3} \sum_{l=0}^{3} |X(i + K, j + 4 + l) - DC(i, j, 2)| +$$

$$\sum_{k=0}^{3} \sum_{l=0}^{3} |X(i + 4 + K, j + 4 + l) - DC(i, j, 3)|$$

In the above equation, the first term to the fourth term indicate respectively the degrees of the first subblock to the fourth subblock to which high frequency components are predominant in the picture data. The first term, for example, is representative of the sum of the absolute values of differences between the individual picture data constituting the subblock 1 and the mean value of the picture data of the subblock 1. This shows the degree to which high frequency components are predominant in the subblock 1.

By determining the degree of high frequency components contained in each subblock and adding the resulting degrees of all the subblocks as described above, it is possible to calculate the activity of the entire block with higher accuracy. Such an alternative procedure for the calculation of a block activity is also successful in eliminating the need for a multiplier and a divider.

Figure 4A:
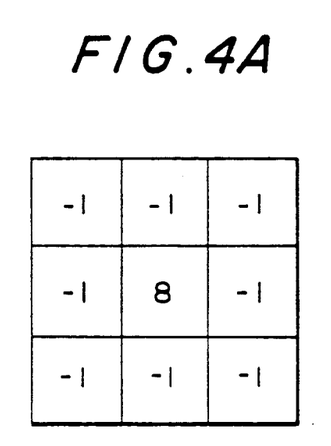
FIGS. 4A to 4C illustrate specific forms of a filter which may be used for calculating an activity.
Figure 4B:
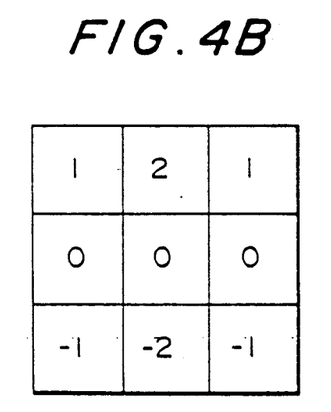
Figure 4C:
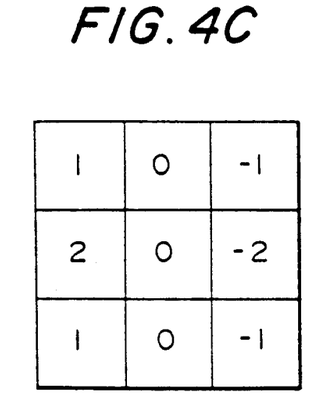
Figure 5:
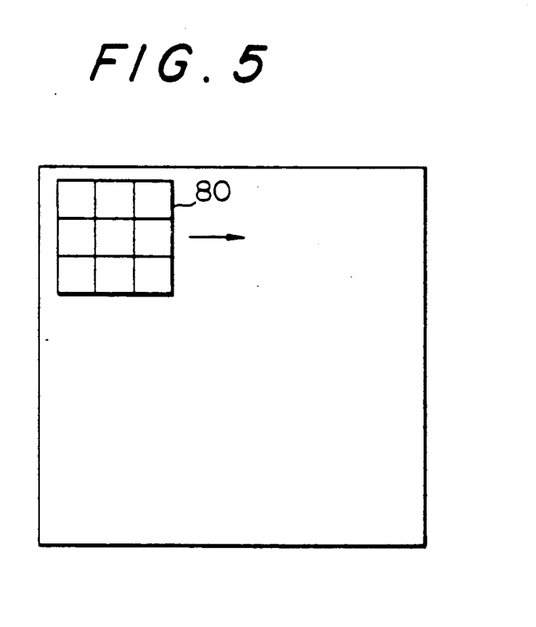
FIG. 5 illustrates how the filter is used to calculate an activity.

Referring to FIGS. 4A to 4C, there are illustrated specific forms of a filter which is another implementation for calculating the block-by-block activity. As illustrated in FIG. 5, any of such filters is sequentially moved from the top left to the bottom right of a block, as indicated by an arrow in the figure. The resulting pixel data outputted by the filter 80 are summed up to produce an activity of the particular block. For example, when the filter 80 illustrated in FIG. 4A is positioned at the top left of the block, it multiplies a pixel $X_{i+1, j+1}$ illustrated in FIG. 6 by 8 and multiplies pixels $X_{i, j}$, $X_{i+1, j}$, $X_{i+2, j}$, $X_{i, j+1}$, $X_{i+2, j+1}$, $j+1$, $X_{i, j+2}$, $X_{i+1, j+2}$ and $X_{i+2, j+2}$ by $-1$. The resulting products are summed up to determine an activity of the block. If the nine pixel data outputted by the filter 80 are identical, meaning that the pixels have no transitions and are DC components, the sum of the output pixel data of the filter 80 will be zero. By so scanning a block by the filter 80 and summing up the resulting pixel data, an activity of the block is determined. The filters illustrated in FIG. 4A to 4C, for example, may be selectively used in matching relation to frequencies to be emphasized in the event of calculation of an activity. This kind of approach also eliminates the need for a multiplier and a divider.

For the calculation of an activity, a transform which uses a non-linear transform coefficient T( ) may be performed, as represented by:

$$ACT(i, j) = \sum_{ii=0}^{7} \sum_{jj=0}^{7} T|X(i + ii, j + jj) - DC(i, j)|$$

Figure 7:
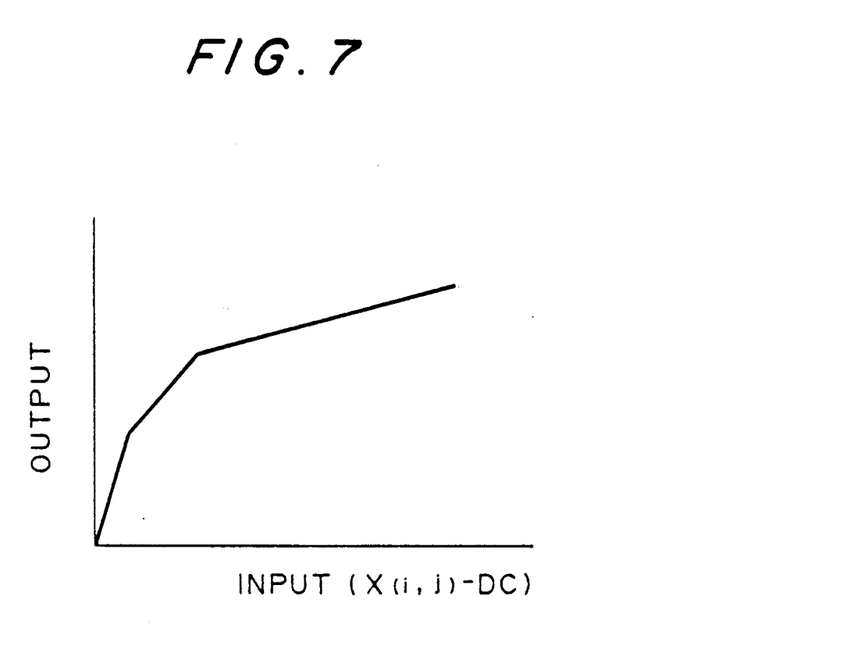
FIG. 7 is a graph illustrating an example of a transform which is executed for the calculation of a block activity.

The transform coefficient T( ) shown above may produce an output which has undergoes a non-linear transform relative to an input [X (i,j)−DC], as illustrated in FIG. 7. The transform illustrated in FIG. 7 will increase the activities associated with low frequency components and thereby increase the number of bits which are distributed to blocks having comparatively low activities. Consequently, the picture quality is enhanced in those portions where the tone is moderate for promoting high quality picture reproduction.

Figure 9A:
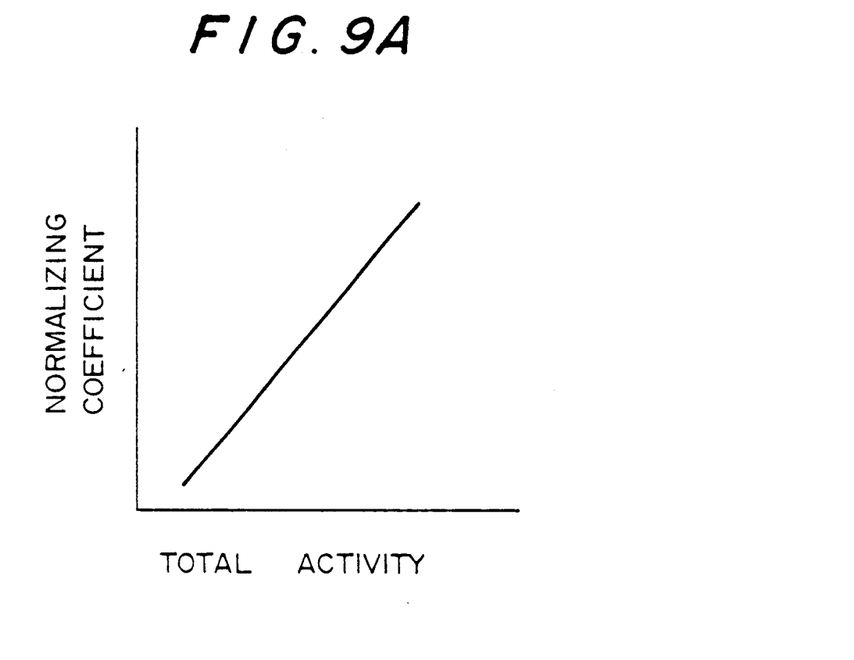
FIGS. 9A and 9B are graphs representative of specific forms of a look-up table for transforming the sum of activities into a normalizing coefficient.
Figure 9B:
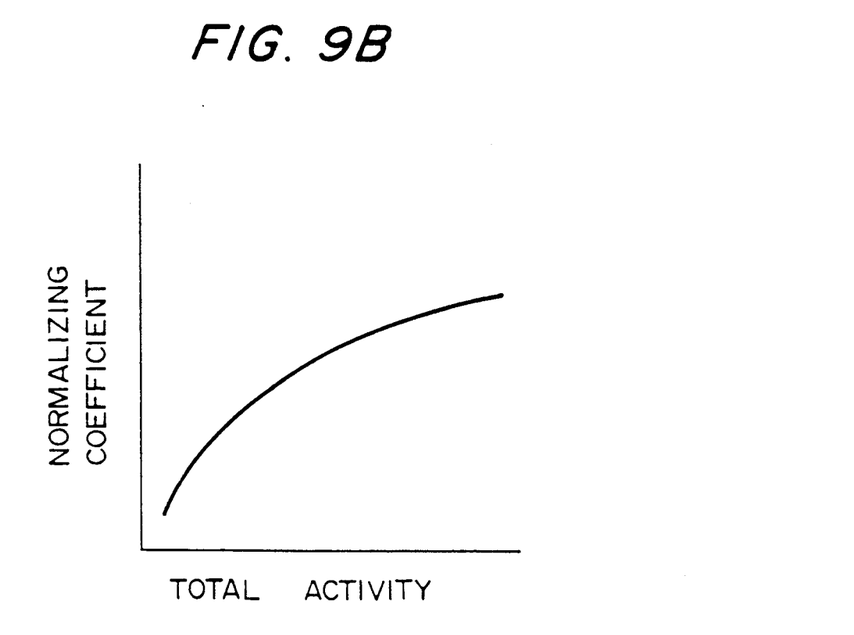

The block activity calculating section 20 calculates an activity block and by block feeds the resulting activities to a total activity calculating section 26 and a bit distribution calculating section 40. The total activity calculating section 26 sums up the block-by-block activities fed from the calculating section 20 to produce a total activity. The total activity is delivered to a normalizing coefficient setting section 22 and the bit distribution calculation section 40. The normalizing coefficient setting section 22 selects a particular normalizing coefficient in response to the total activity. The selection of a normalizing coefficient may be implemented by a look-up table which is stored in a storage, not shown, and by the transform illustrated in FIG. 9A or 9B by way of example. The specific transform illustrated in FIG. 9A causes the normalizing coefficient to vary in proportion to the total activity. On the other hand, the transform illustrated in FIG. 9B suppresses the increase in the normalizing coefficient relative to the increase in the total activity, thereby promoting accurate coding. The normalizing coefficient selected by the setting section 22 is fed to the normalizing section 16.

The normalizing section 16 normalizes the picture data by the normalizing coefficient fed thereto from the normalizing coefficient setting section 22, i.e., it divides each block of picture data by the normalizing coefficient. Since the normalizing coefficient is derived from the sum of activities of individual blocks as stated above, it is commonly applied to all the blocks which constitute a single picture.

Figure 10:
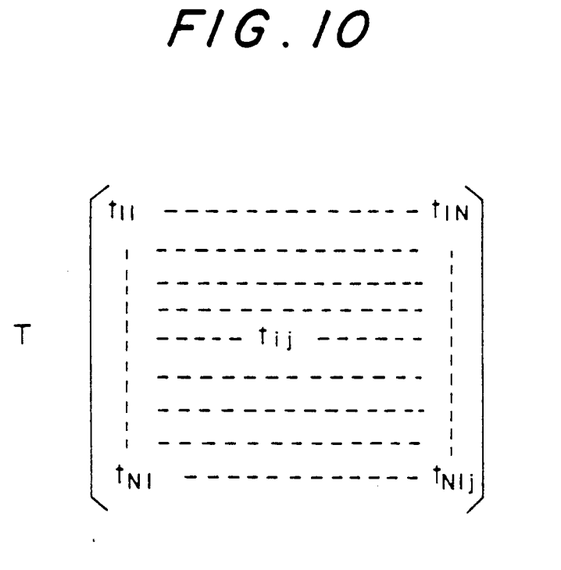
FIG. 10 illustrates an example of a weight table.

While the transform coefficients have been illustrated and described as being divided by a single selected normalizing coefficient $\alpha$, the normalizing coefficient $\alpha$ may be used in combination with a weight table T illustrated in FIG. 10. In the weight table T of FIG. 10, smaller values are assigned to lower frequency components while larger values are assigned to higher frequency components, because transform coefficients lying in the lower frequency range are more important as data. The data illustrated in the weight table T are individually multiplied by the normalizing coefficient $\alpha$, and then the transform coefficients other than the discarded coefficients are divided by the individual products $\alpha \cdot T$ and thereby normalized. If desired, $1/\alpha$ or $1/(\alpha \cdot T)$ may be calculated beforehand and used to multiply the transform coefficients. This will allow the transform coefficients to be normalized, i.e., divided by $\alpha$ or $\alpha \cdot T$ with a minimum number of dividers, thereby reducing the scale of the entire device.

Figure 11:
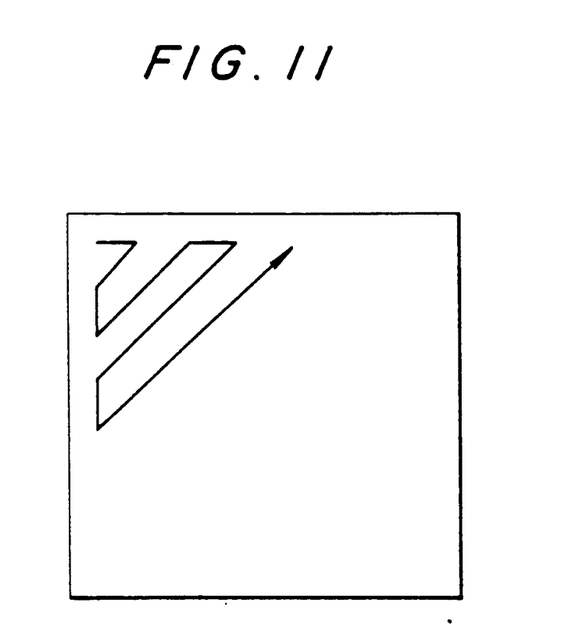
FIG. 11 illustrates a sequence for coding run-lengths and nonzero amplitudes.

The normalized transform coefficients are arranged in a block in the same manner as the pixel data as illustrated in FIG. 2. The block of normalized transform coefficients are sequentially scanned in a zig-zag fashion as illustrated in FIG. 11 with the lower frequency components being first.

The output of the normalizing section 16 is applied to a two-dimensional Huffman coding section 28. In the normalized transform coefficients scanned zig-zag as stated above, zero often appears continuously. The Huffman coding section 28, therefore, determines the amount of continuously appearing zeros, i.e., a zero run-length and an amplitude of non-zeros. The output of the Huffman coding section 28 is fed to an output terminal 32 and a code counting section 44.

The bit distribution calculating section 40 calculates the coded bits to be distributed to the individual blocks by using the block-by-block activities produced by the block activity calculating section 20 and the total activity fed from the total activity calculating section 26. The words "coded bits to be distributed to the individual blocks" mean a particular bit of a string of data Huffman-coded block by block and being sequentially outputted from the lower frequency components to the higher frequency components where the string is to be cut off, i.e., the number of bits which determines up to which bit the coded data constituting a block are to be outputted.

The number of coded bits bit (i, j) to be distributed to each block is expressed as:

$$\text{bit}(i, j) = \{\text{total number of bits of entire picture} \times \quad \text{Eq. (1)}$$
$$ACT(i, j)/\text{total activity}\} + [\text{residual bits up to preceding block}]$$

In the Eq. (1), the words "total number of bits of entire picture" refer to the number of bits to be assigned to the entire picture which includes a plurality of blocks in the event of coding. More specifically, they mean the number of bits indicating how many bits should be allocated to the entire picture when strings of block-by-block Huffman-coded data sequentially outputted from the lower frequency components are individually cut off at particular bits thereof. By such a number of bits, the amount of data to be compressed and outputted is determined. ACT (i, j) is representative of the activity of each block, while the total activity is the sum of the activities of the individual blocks. Hence, {total number of bits of entire picture×ACT (i, j)/total activity} included in the Eq. 1 refers to distributing the number of bits assigned to the entire picture on the basis of a ratio of the activity of each block to the total activity of all of the blocks.

Further, [residual bits up to preceding block] also included in the Eq. (1) means the number of residual bits produced up to the block immediately preceding a block of interest to which the coded bits bit (i, j) being calculated are to be allocated, i.e., a difference between the number of bits distributed up to the immediately preceding block and the number of bits having been actually coded and outputted. For example, assuming that fifty bits have been distributed to the immediately preceding block and forty-five coded bits have been actually outputted, then the number of residual bits is five. The number of such residual bits is added to the block of interest so as to prevent the difference between the number of bits distributed to the individual blocks and the number of actually outputted bits sequentially accumulating along the blocks.

Alternatively, the bit distribution calculating section 40 may determine the coded bits bit (i, j) to be allocated to a block by using an equation:

$$\text{bit}(i, j) = [\text{total number of bits of entire picture} - \sum^{i-1} \sum^{j} \text{bit}(k, 1)] \times ACT(i, j)/[\text{total activity} - \sum^{i-1} \sum^{j} ACT(i, j)] \quad \text{Eq. (2)}$$

In the Eq. (2), $\Sigma\Sigma$ bit (k, 1) is representative of the sum of bits having been distributed up to the immediately preceding block. Therefore, $$[\text{total number of bits of entire picture} - \sum^{i-1} \sum^{j} \text{bit}(k, 1)]$$

indicates the number of bits to be allocated to the remaining blocks. Further, $$\sum^{i-1} \sum^{j} ACT(k, j)$$

is the sum of activities of all of the preceding blocks. It follows that $$[\text{total activity} - \sum^{i-1} \sum^{j} ACT(i, j)]$$

is representative of the sum of acitvities of the remaining blocks.

According to the Eq. (2), the total number of bits to be allocated to the remaining blocks is distributed on the basis of the ratio of the activity of a particular block to the sum of activities of all of the remaining blocks. Since the coded bits bit (i, j) to be distributed to a particular block are determined by taking account of the number of bits having been distributed to the preceding blocks and the activities of the preceding blocks, a difference between the total number of bits allocated to the individual blocks and the total number of bits constituting the entire picture is reduced when compared to the approach using the Eq. (1).

Another alternative approach for determining the coded bits bit (i, j) to be distributed to the individual blocks is as follows:

$$\text{bit}(i, j) = [\text{total number of bits of entire picture} - \text{actual bits fed up to } \Sigma \text{ block}] \times ACT(i, j)/[\text{total activity} - \Sigma \Sigma ACT(i, j)] \quad \text{Eq. (3)}$$

In the Eq. (3), [total number of bits of entire picture—actual bits fed up to $\Sigma$ block] is representative of the sum of the number of bits having been actually coded and outputted up to the immediately preceding block. Therefore, [total number of bits of entire picture—actual bits fed up to $\Sigma$ block] is the total number of bits to be allocated to the remaining blocks which is determined by taking account the number of bits actually coded and outputted up to the immediately preceding block.

The approach represented by the Eq. (3) distributes the total number of bits to be allocated to the remaining blocks and determined by taking account of the number of bits having been actually coded and outputted up to the immediately preceding block, on the basis of the ratio of the activity of a block of interest to the total activity of the remaining blocks. Since the coded bits bit (i, j) to be allocated to a block is determined with the number of bits having been actually coded and outputted up to the immediately preceding block and the activities of the preceding blocks being taken into account, it is not necessary to give consideration to the residual bits up to the immediately preceding block, in contrast to the cases with the Eqs. (1) and (2).

The bits bit (i, j) to be distributed to a block as determined by the bit distribution calculating section 40 is applied to a coding end deciding section 42. On the other hand, the coded outputs of the Huffman coding section 28 are fed to the code counting section 44. The code counting section 44 determines the amount of codes outputted by the Huffman coding section 28 block by block, i.e., counts the bits block by block. The code counting section 44 adds the bit number of coded data to be outputted by the Huffman coding section 28 next to the determined amount of code for delivering the resulting sum to the coding end deciding section 42.

The coding end deciding section 42 compares the number of bits associated with a block of interest as determined by the code counting section 44 with the coded bits bit (i, j) allocated to that block and fed from the bit distribution calculating section 40. As the number of bits fed from the code counting section 44 exceeds the coded bits bit (i, j), the deciding section 42 feeds a signal to the Huffman coding section 28 to cause the latter to stop outputting coded data. As a result, the Huffman coding section 28 does not output coded data associated with the bit number added by the code counting section 44 last, i.e., coded data to be outputted next. This prevents the number of bits of coded data being outputted by the Huffman coding section 28 from exceeding the number of coded bits bit (i, j) which is outputted by the bit distribution calculating section 40. More specifically, the Huffman coding section 28 stops outputting coded data associated with a block of interest when coded data which is one bit short of the distributed coded bits is reached.

Further, the coding end deciding section 42 produces a difference between the number of distributed coded bits and the number of bits of outputted coded data, i.e., the number of residual bits. In the case that the number of coded bits bit (i, j) is to be determined by either one of the Eqs. (1) and (2), the bit distribution calculating section 40 is supplied with the number of residual bits from the coding end deciding section.

The compressed picture data from the two-dimensional Huffman coding section 28 are fed out via the output terminal 32. The compressed picture data from output terminal 32 may be sent over a transmission path, not shown, to a remote station or recorded in a magnetic disk or similar recording medium.

Figure 12:
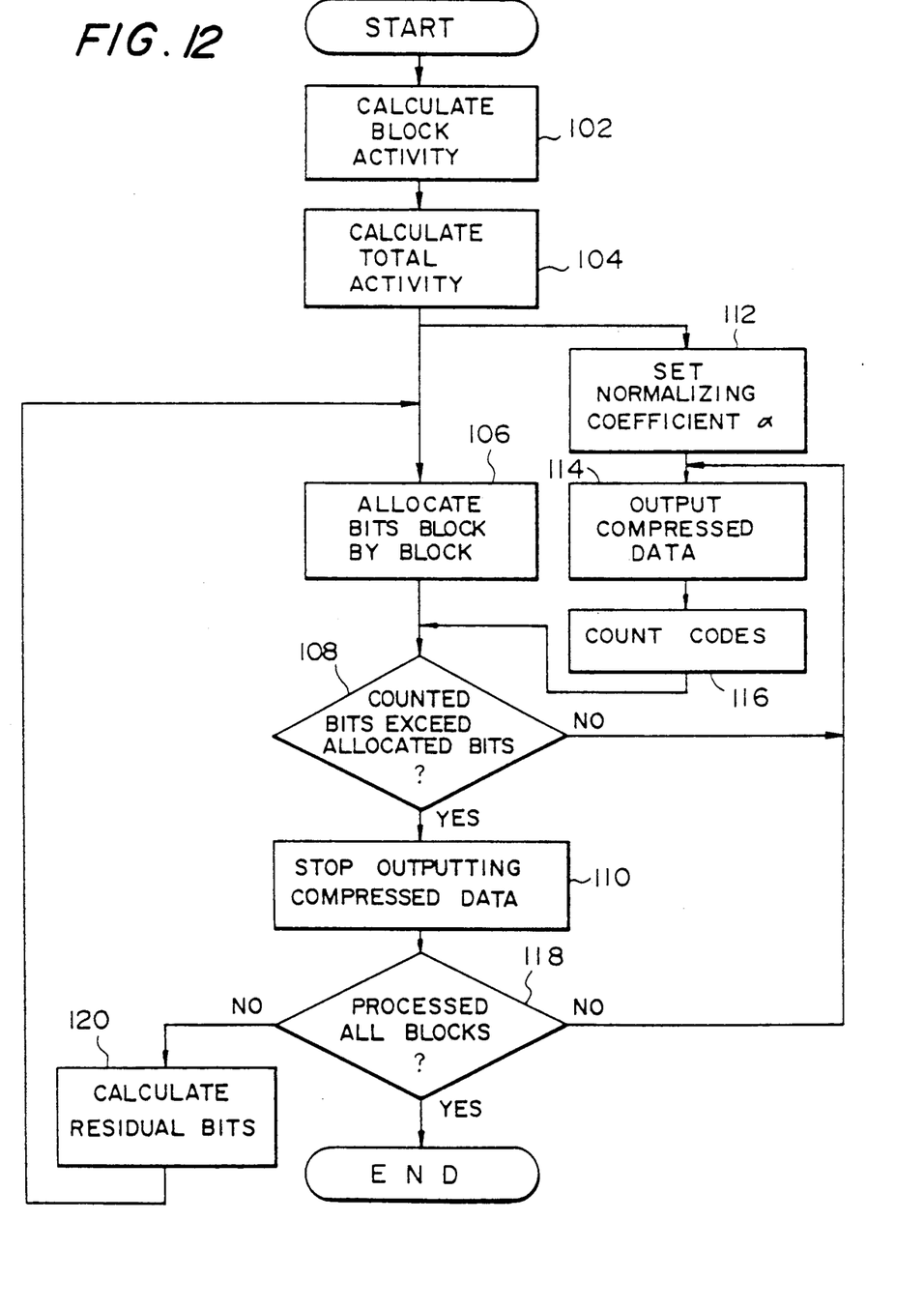
FIG. 12 is a flowchart demonstrating a specific operation of the coding device illustrated in FIG. 1 which is executed for distributing bits.

Reference will be made to FIG. 12 for describing a part of the operation of the illustrative embodiment which is related to the distribution of bits. The program begins with a step 102 for causing the block activity calculating section 20 to calculate activities of the individual blocks. Then, the total activity calculating section 26 sums up the block-by-block activities determined by the block activity calculating section 20 so as to produce the sum of activities of the entire picture, i.e., the total activity (step 104).

The normalizing coefficient setting section 22 selects a normalizing coefficient $\alpha$ by using the total activity fed from the total activity calculating section 26 and delivers it to the normalizing section 16 (step 112). The normalizing section 16 normalizes picture data or transform coefficients by using the normalizing coefficient $\alpha$. The normalized picture data are fed to the two-dimensional Huffman coding section 28 to be coded or compressed thereby, the resulting data being scanned and outputted (step 114). The coded data from the Huffman coding section 28 are counted by the code counting section 44 (step 116).

On the other hand, the output of the block activity calculating section 20 and the output of the total activity calculating section 26 are applied to the bit distribution calculating section 40. In response, the calculating section 40 determines bit distribution block by block, as stated previously (step 106). The coding end deciding section 42 compares the number of bits allocated to a block of interest as determined by the bit distribution calculating section 40 and the amount of codes actually counted by the code counting section 44 (step 108). When the deciding section 42 determines that the number of bits counted by the code counting section 44 exceeds the number of allocated bits, it disables the Huffman coding section 28 when the latter has outputted a particular code which is one bit short of the number of allocated bits (step 110).

When the Huffman coding section 28 stops outputting codes as stated above, whether or not all the blocks of picture data have been processed (step 118) is determined. If the answer of the step 118 is YES, the coding operation is terminated. If the answer of the step 118 is NO, the number of residual bits to be allocated to the next block is calculated (step 120) and the program returns to the step S106 for calculating the number of bits to be allocated to the next block.

As stated above, in accordance with the illustrative embodiment, a total activity which is the sum of block-by-block activities is determined and, based on the determined total activity, a normalizing coefficient $\alpha$ is selected for normalization. The normalizing coefficient $\alpha$, therefore, is so selected as to maintain the amount of coded picture data constant at all times. This promotes easy processing of output data and thereby facilitates storage of such data in a memory as needed.

The embodiment illustrated and described determines the number of coded bits to be allocated to a block of interest by using the ratio of the block-by-block activity to the total activity. Therefore, the number of bits to be distributed to the entire picture which includes a plurality of blocks is maintained constant, while the number of bits to be allocated to a block is determined on the basis of the activity particular to that block. This allows each block of data to be effectively coded based on the activity of that block. Specifically, larger numbers of bits are allocated to blocks having many high frequency components therein and, therefore, high activities, while smaller number of bits are allocated to blocks having many low frequency components and, therefore, low activities.

In the illustrative embodiment, picture data are normalized by a normalizing coefficient $\alpha$ which matches the frequency components contained in the entire picture. A reproduced picture, therefore, does not suffer from unstable quality as would occur if blocks of picture data were normalized with a normalizing coefficient being selected block by block.

Furthermore, the block-by-block activities and the total activity are implemented by a linear circuit including an adder and a data shifting device. This eliminates the need for a multiplier and an adder and thereby simplifies a coding device. Since the activities are directly calculated out of picture data, a buffer for storing data is not necessary in contrast to the case wherein block activities are calculated by using data which undergoes the orthogonal transform. Various kinds of look-up tables may be used to select a normalizing coefficient $\alpha$ on the basis of the total activity, insofar as they are capable of maintaining the amount of compressed data constant. If desired, a look-up table may be replaced with an arithmetic operation which produces a normalizing coefficient $\alpha$ from the total activity, as described later.

Further, data representative of a selected normalizing coefficient $\alpha$ may be outputted together with picture data. Then, a decoding device will be able to decode the coded picture data by using the same normalizing coefficient $\alpha$.

Figure 14:
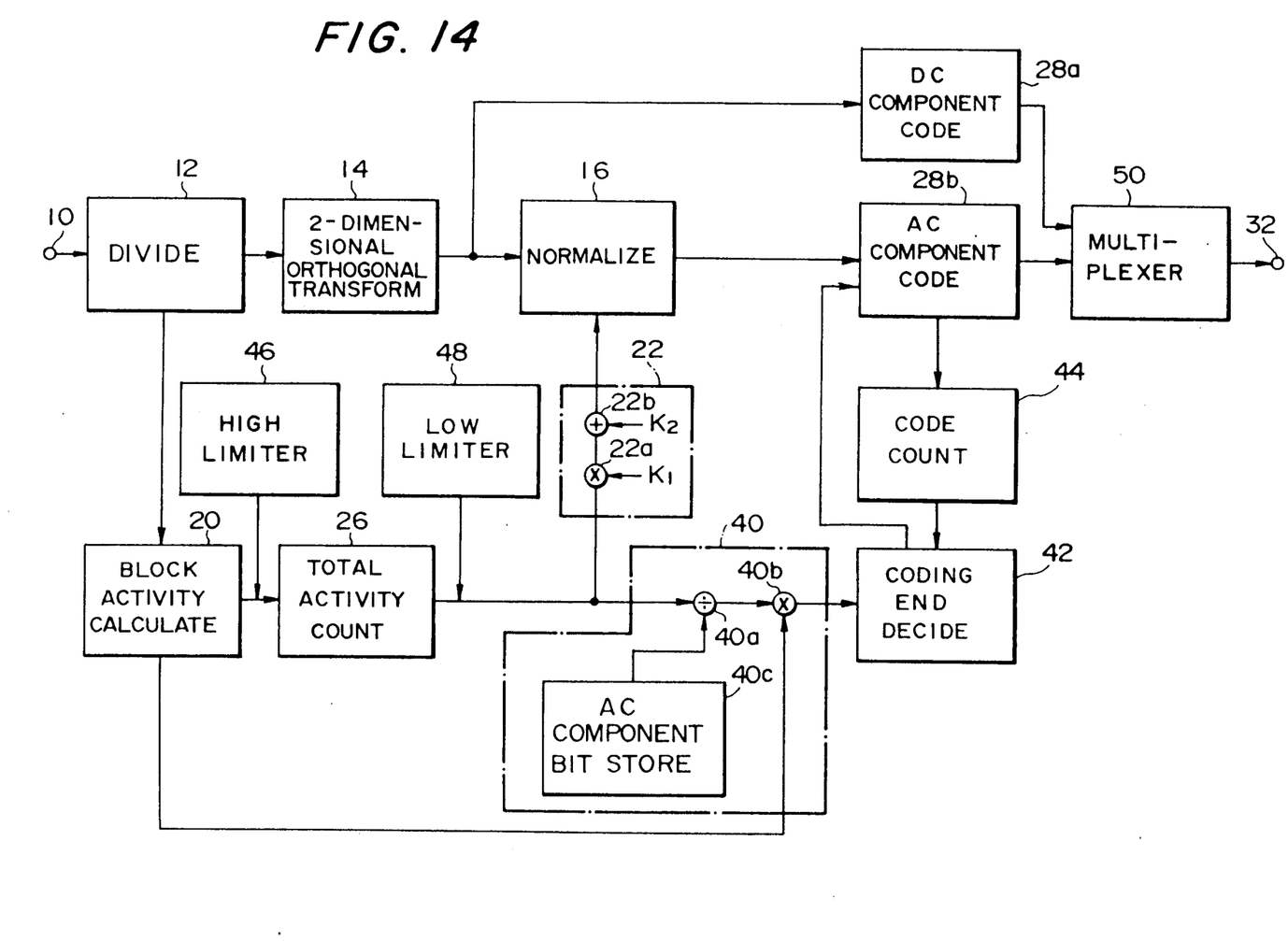
FIG. 14 is a schematic block diagram illustrating an alternative embodiment of the coding device in accordance with the present invention.

Referring to FIG. 14, an alternative embodiment of the coding device in accordance with the present invention is illustrated. As illustrated, the output of the two-dimensional orthogonal transforming section 14 is connected to a DC component coding section 28a as well as to the normalizing section 16. Among the transfer coefficients subjected to the two-dimensional orthogonal transform, DC components are fed to the DC component coding section 28a with AC components being applied to the normalizing section 16. The normalized AC components of the transform coefficients are delivered from the normalizing section 16 to an AC component coding section 28b. The DC component and AC component coding sections 28a and 28b, respectively, correspond to the two-dimensional Huffman coding section 28 which is included in the coding device of FIG. 1. The DC component coding section 28a codes DC components of the transform coefficients, while the AC component coding section 28b codes normalized AC components of the same.

The outputs of the DC component and AC component coding sections 28a and 28b are connected to a multiplexer 50. In response to a control signal outputted by a controller, not shown, the multiplexer 50 sequentially selects the coded DC component data from the DC component coding section 28a and the code AC component data from the AC component coding section 28b while feeding them to the output terminal 32.

A high limiter 46 limits the maximum value of the output of the block activity calculating section 20. By limiting the maximum value of the block-by-block activities by the high limiter 46, it is possible to restrict the activities of those blocks having extremely high activities and thereby to prevent the coding device from being increased in circuit scale. The output of the block activity calculating section 20 which is limited to a maximum value by the high limiter 46, is fed to the total activity calculating section 26. The total activity calculating section 26 sums up the block-by-block activities fed thereto from the block activity calculating section 20 to thereby produce a total activity, as in the embodiment of FIG. 1. A low limiter 48 limits the minimum value of the total activity which is outputted by the total activity calculating section 26. Limiting the minimum value of the total activity is effective to limit the maximum number of bits to be distributed, as described in detail later. It is to be noted that the high limiter 46 and the low limiter 48 may be omitted, as the case requires.

The total activity determined by the total activity calculating section 26 is applied to a multiplier 22a which is built in the normalizing coefficient setting section 22. The multiplier 22a multiplies data representative of the total activity (total ACT) by a predetermined coefficient K1. The resulting output (K1·total ACT) is fed to an adder 22b also built in the normalizing coefficient setting section 22. The adder 22b adds a predetermined coefficient K2 to the product (K1·total ACT) to produce (K1·total ACT+K2). In this manner, the normalizing coefficient setting section 22 determines a normalizing coefficient α based on the total activity and by using the coefficients K1 and K2. The normalizing coefficient α is delivered to the normalizing section 16.

The total activity from the total activity calculating section 26 is also fed to a divider 40a which is included in the bit distribution calculating section 40. An AC component bit storing section 40c is also included in the calculating section 40 for storing the number of AC component bits. The storing section 40c feeds "total bits—DC bits" to the divider 40a. Here "total bits" refers to the number of bits to be allocated to the coding of all of the normalized transform coefficients, while "DC bits" refers to the number of bits to be allocated to the coding of DC components of transform coefficients. Hence, "total bits—DC bits" is representative of the number of bits to be allocated to the coding of normalized AC components of transform coefficients. The divider 40a divides "total bits—DC bits" from the AC component bit storing section 40c by the total activity data from the total activity calculating section 26, i.e. [total bits—DC bits]/total activity.

The output of the divider 40a is fed to a multiplier 40b which is built in the bit distribution calculating section 40. Also fed to the multiplier 40b is the block-by-block activity data as produced by the block activity calculating section 20. The multiplier 40b multiplies

[total bits—DC bits]/total activity by a block-by-block activity to produce

[total bits—DC bits]·block activity/total activity.

By the above procedure, a particular number of bits is allocated to the coding of "total bits—DC bits", i.e., AC components on the basis of the ratio of the activity of a block of interest to the total activity. A product outputted by the multiplier 40b is fed to the coding end deciding section 42.

The output of the AC component coding section 28b is applied to the code counting section 44. The code counting section 44 determines the amount of coded AC components and delivers it to the coding end deciding section 42. The deciding section 42 compares the actual amount of codes determined by the counting section 44 with the number of bits allocated by the multiplier 40b. If the amount of code is greater than the number of allocated bits, the deciding section 42 causes the AC component coding section 28b to stop outputting coded data responsive to coded data being one bit short of the allocated bits.

As stated above, this particular embodiment classifies transform coefficients, which undergoes two-dimensional orthogonal transform into DC components and AC components. The DC component data are coded by the DC component coding section 28a, and the resulting coded DC components are fed to the multiplexer 50 without being limited in the number of bits because the amount of coded DC component data is constant. On the other hand, the AC component data are normalized by a normalizing coefficient which matches the activity of a block of interest and then coded by the AC component coding section 28b. The number of bits of AC component data is limited by the number of bits allocated to each block on the basis of the activity. The distribution of bits is such that AC component bits are allocated in matching relation to the block-by-block activity. Since the number of bits to be allocated to AC components is produced by subtracting the number of bits to be allocated to DC components from the total number of bits and is distributed on the basis of the block-by-block activity as stated above, the number of bits of coded AC components can be adequately set.

Again, 1/α or 1/(α·T) may be produced beforehand and then multiplied by transform coefficients for normalizing the transform coefficients. This is effective in reducing the required number of dividers and thereby scaling down the coding device, as stated in relation to the previous embodiment.

In the embodiments illustrated and described, the activities of individual blocks are calculated by using pixel data which include a single picture. Alternatively, the block activity calculating section 20 may be supplied with transform coefficient data subjected to the orthogonal transform by the orthogonal transforming section 14 calculating the block activities by using an equation:

$$ACT(i, j) = \sum_{ii=0}^{7} \sum_{jj=0}^{7} |\text{coef}(i + ii, j + jj)|$$

where ii is equal to jj which is not equal to zero.

Another implementation available for the calculation of block activities is weighting transform coefficients which undergoes the orthogonal transform, as follows:

$$ACT(i, j) = \sum_{ii=0}^{7} \sum_{jj=0}^{7} |W(ii, jj) \times \text{coef}(i + ii, j + jj)|$$

The weight represented by W (ii,jj), like the weight T ( ) for calculating activities from pixels as stated earlier, increases the number of bits to be allocated to, for example, a block in which low frequency components are predominant, thereby enhancing high quality playback.

An arrangement may be made such that a block activity ACT(i,j) produced by the block activity calculating section 20 is subjected to a limiter transform T1 as expressed as:

ACT'(i,j) = T1(ACT(i,j))

Figure 8:
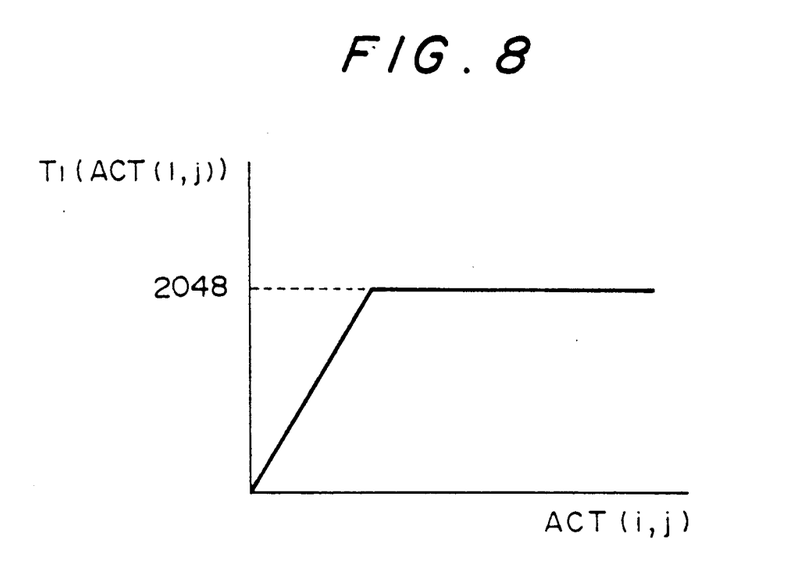
FIG. 8 is a graph illustrating another example of a transform of a block activity.

By the limiter transform T1, the block activity (i,j) is limited at a predetermined threshold value such as 2048 as illustrated in FIG. 8. Introducing an upper limit in the block activities ACT(i,j) as stated is successful in reducing the number of bits of the total activity of the entire picture.

When the picture data applied to any of the embodiments illustrated and described is a color picture signal, data compression is effected on each of a luminance signal Y and chrominance signals R-Y and B-Y which include the color picture signal. A procedure for distributing bits to coded outputs associated with the signals Y, R-Y and B-Y will be described with reference to FIG. 13.

Figure 13:
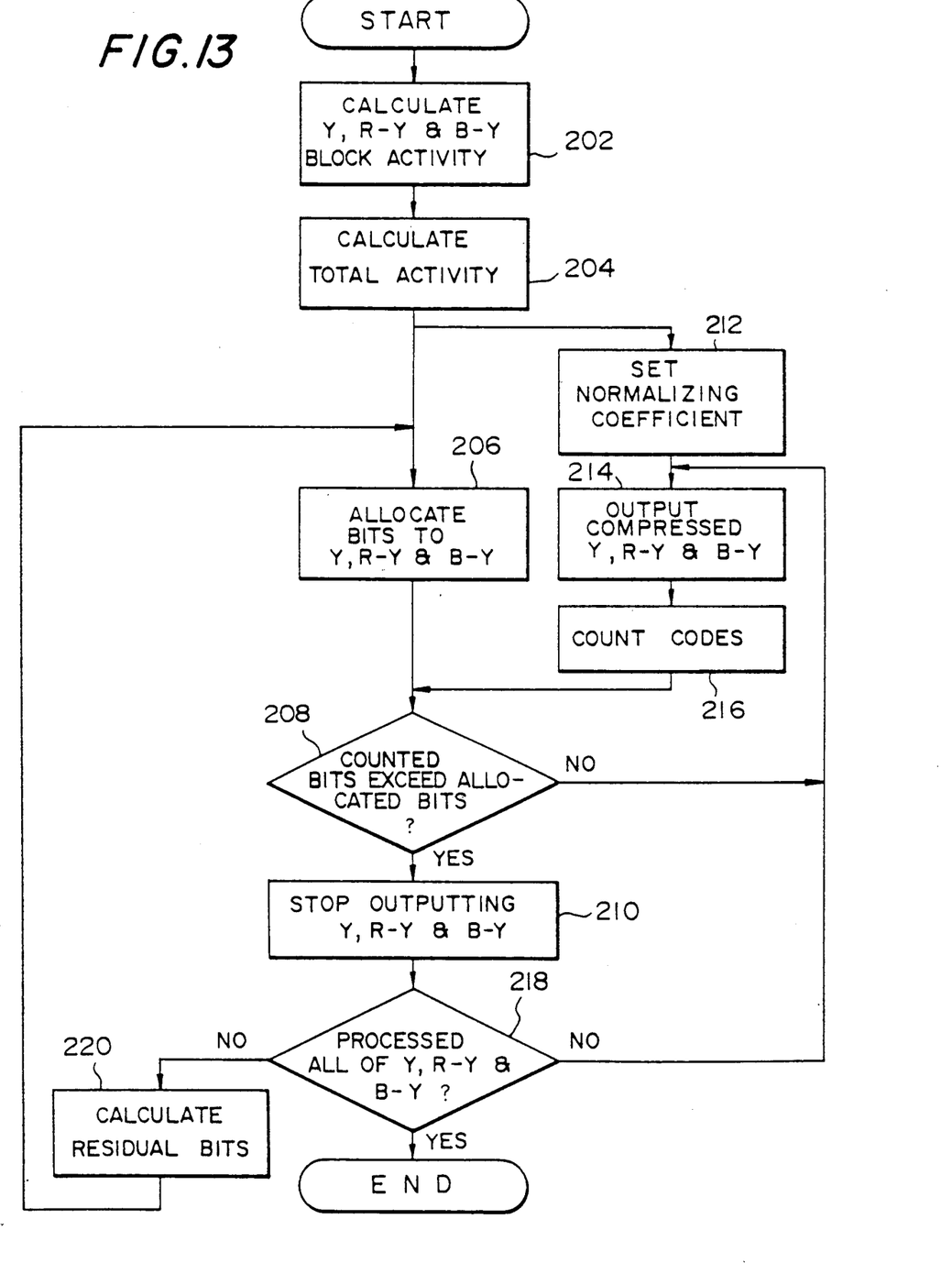
FIG. 13 is a flowchart showing a specific operation of the coding device of FIG. 1 which is associated with the bit distribution of a color picture signal.

The procedure illustrated in FIG. 13 begins with a step 202 for determining an activity block by block with respect to each of the luminance signal Y and chrominance signals R-Y and B-Y. The determined block-by-block activities are summed up to produce the total activity of the entire picture data which includes the luminance signal Y and chrominance signals R-Y and B-Y (step 204). Then, the bit distribution to the blocks of the luminance signal Y and chrominance signals R-Y and B-Y is calculated on the basis of the ratio of the activities of the signals Y, R-Y and B-Y to the total activity (step 206).

The step 206 is followed by a step 212 for calculating a normalizing coefficient for the entire picture on the basis of the total activity. The luminance signal Y is compressed first by using the normalizing coefficient, and the compressed data are outputted (step 214). The bits of the coded output are counted (step 216), and then the count is compared with the number of bits distributed to an associated one of the blocks of the luminance signal Y (step 208). When the number of bits of the coded output exceeds the number of bits allocated to the block, the output is interrupted response to a code being one bit short of the distributed number of bits (step 210), as stated earlier. This is followed by a step 210 for determining whether or not all the blocks have been processed. At this instant, since chrominance signals R-Y and B-Y have not been processed yet, the number of residual bits associated with the luminance signal Y is calculated (step 220). Then, the program returns to the step 206 to add the residual bits to the bits allocated to the individual blocks of the chrominance signal R-Y.

Based on the bit distribution with the above-mentioned residual bits, the chrominance signal R-Y is compressed (step 214). This is followed by the same sequence of steps 216, 208, 210 and 220 as have been executed with the luminance signal Y. The residual bits calculated in the step 220 with the chrominance signal R-Y are added to the bits which are allocated to the individual blocks of the other chrominance signal B-Y (step 206). Then, the chrominance signal B-Y is compressed on the basis of the resulting bit distribution (step 14). The delivery of resulting codes representative of the chrominance signal B-Y is stopped response to a code being one bit short of the number of distributed bits (step 210). By such a procedure, the picture signal representative of a single color picture is fully coded.

As stated above, the amount of coded data representative of a color picture signal is maintained constant by applying residual bits associated with a luminance signal Y to a chrominance signal R-Y and residual bits associated with the chrominance signal R-Y to a chrominance signal B-Y. Further, since the residual bits resulting from the compression of the luminance signal Y are used to compress chrominance signals, a greater amount of information can be assigned to chrominance signals to enhance the quality of color data to be outputted.

The compressed data representative of a luminance signal Y are outputted and written in a recording medium before chrominance signals. Hence, even if the length of coded data of the luminance signal Y is not constant, the signal Y can be readily searched for out of the recording medium because the address where it is recorded is fixed.

If desired, chrominance signals R-Y and B-Y may be compressed first so as to add the residual bits resulting from the compression to the bits which are allocated to a luminance signal Y. This is also successful in maintaining the amount of coded data representative of a color picture signal constant. In addition, since a greater amount of information can be assigned to the luminance signal Y, it is possible to output picture data analogous to a black-and-white picture involving a relatively small amount of color information with high quality.

In summary, it will be seen that the present invention provides a compression coding device which normalizes transform coefficients which undergo the orthogonal transform by selecting a normalizing coefficient on the basis of a total block activity. The device, therefore, compresses a picture signal in matching relation to frequency components which constitute a picture, whereby the amount of coded data is maintained constant. Further, since the amount of coded data to be outputted is restricted block by block in response to the activity of a block relative to the total activity, data associated with a block can be outputted in an amount which is associated with the frequency components of that block.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A picture signal compression coding device for dividing digital picture data representative of a single picture into a plurality of blocks and coding said plurality of blocks of digital picture data by a two-dimensional orthogonal transform, said device comprising:

orthogonal transforming means for subjecting each of the plurality of blocks of digital picture data to the two-dimensional orthogonal transform;

normalizing means for normalizing the digital picture data transformed by said orthogonal transforming means;

coding means for coding the data normalized by said normalizing means;

block activity calculating means for calculating an activity of the picture data block by block;

activity adding means for producing a total activity by summing up the activities of the individual blocks calculated by said block activity calculating means;

distributing means for calculating amounts of data to be distributed to the individual blocks on the basis of a ratio of the block-by-block activity calculated by said block activity calculating means to the total activity calculated by said activity adding means; and control means for restricting an amount of data to be outputted by said coding means in response to an output of said distributing means;

said control means comparing the amount of data to be allocated to any of the blocks of interest with the amount of data of said block being actually outputted by said coding means, and restricting the amount of data to be outputted by said coding means such that said amount of data from said coding means fails to exceed said amount of data allocated to said block.

2. A coding device in accordance with claim 1, wherein said distributing means calculates the amount of coded data to be allocated to the block of interest by multiplying the amount of coded data of the entire picture data by the ratio of the activity of said blocks to the total activity and then adding an amount of residual data associated with the block which has been coded prior to said block of interest.

3. A coding device in accordance with claim 1, wherein said distributing means calculates the amount of coded data to be allocated to any of the blocks of interest by subtracting the amount of coded data of the blocks having been outputted from the amount of coded data of the entire picture data to produce a difference and then multiplying said difference by the ratio of the activity of said block of interest to the total activity.

4. A coding device in accordance with claim 1, wherein said distributing means calculates the amount of AC component data to be distributed to any of the blocks of interest by multiplying the amount of AC data of the data which undergo a transform coefficient by the ratio of the activity of said block of interest to the total activity.

5. A coding device in accordance with claim 4, wherein said distributing means calculates the amount of coded data of AC components to be distributed to any of the blocks of interest by adding the amount of residual data of AC component data of the block having been coded to the amount of coded data of AC component data to be distributed to said block of interest.

6. A coding device in accordance with claim 4, wherein said distributing means calculates the amount of AC component data to be distributed to any of the blocks of interest by subtracting the amount of coded data of AC components of the block having been outputted from the amount of coded data of AC component data of the data which undergo the orthogonal transform to produce a difference, and multiplying said difference by the ratio of the activity of said block of interest to the total activity.

* * * * *